US007277196B2

(12) United States Patent
Van de Capelle et al.

(10) Patent No.: US 7,277,196 B2
(45) Date of Patent: Oct. 2, 2007

(54) ITERATIVE PRINTER CONTROL AND COLOR BALANCING SYSTEM AND METHOD USING A HIGH QUANTIZATION RESOLUTION HALFTONE ARRAY TO ACHIEVE IMPROVED IMAGE QUALITY WITH REDUCED PROCESSING OVERHEAD

(75) Inventors: Jean-Pierre R. M. Van de Capelle, Rochester, NY (US); Lalit K. Mestha, Fairport, NY (US); Robert P. Loce, Webster, NY (US); Raja Bala, Webster, NY (US); Martin S. Maltz, Rochester, NY (US); Peter A. Crean, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 902 days.

(21) Appl. No.: 10/342,873

(22) Filed: Jan. 15, 2003

(65) Prior Publication Data

US 2004/0136015 A1    Jul. 15, 2004

(51) Int. Cl.
*G06F 15/00* (2006.01)
(52) U.S. Cl. .................. 358/1.9; 358/504; 358/534; 358/518
(58) Field of Classification Search .............. 358/1.9, 358/504, 534, 518
See application file for complete search history.

(56) References Cited

U.S. PATENT DOCUMENTS

| | | | |
|---|---|---|---|
| 2,297,691 A * | 10/1942 | Carlson ................. | 430/55 |
| 4,933,754 A * | 6/1990 | Reed et al. ............ | 358/506 |
| 5,268,754 A | 12/1993 | Van de Capelle et al. .. | 358/527 |
| 5,625,716 A | 4/1997 | Borg ..................... | 382/254 |
| 5,689,349 A | 11/1997 | Plettinck et al. ....... | 358/500 |
| 5,920,407 A * | 7/1999 | Erickson et al. ........ | 358/504 |
| 5,995,714 A * | 11/1999 | Hadley et al. .......... | 358/1.9 |
| 6,008,907 A * | 12/1999 | Vigneau et al. ........ | 358/1.9 |

(Continued)

FOREIGN PATENT DOCUMENTS

EP    0 854 638 A2    7/1998

(Continued)

OTHER PUBLICATIONS

European Search Report for Application No. EP 04 00 0647; Date of Transmittal of Search Nov. 4, 2005.

(Continued)

*Primary Examiner*—Twyler Lamb
*Assistant Examiner*—Jacky X. Zheng
(74) *Attorney, Agent, or Firm*—Fay Sharpe LLP

(57) ABSTRACT

A system and method for printer control and color balance calibration. The system and method address the image quality problems of print engine instability, low quality of color balance and contouring from the calibration. The method includes defining combinations of colorants, such as inks or toners that will be used to print images, defining a desired response for the combinations that are to be used and, in real time, iteratively printing CMY halftone color patches, measuring the printed patches via an in situ sensor and iteratively performing color-balance calibration based on the measurements, accumulating corrections until the measurements are within a predetermined proximity of the desired response. The calibration is performed on the halftones while they are in a high quantization resolution form.

9 Claims, 4 Drawing Sheets

U.S. PATENT DOCUMENTS

| | | | |
|---|---|---|---|
| 6,027,201 A * | 2/2000 | Edge | 347/19 |
| 6,061,501 A | 5/2000 | Decker et al. | 358/1.9 |
| 6,178,007 B1 | 1/2001 | Harrington | 358/1.9 |
| 6,236,474 B1 | 5/2001 | Mestha et al. | 358/520 |
| 6,366,306 B1 * | 4/2002 | Fukuda | 347/172 |
| 6,435,654 B1 * | 8/2002 | Wang et al. | 347/43 |
| 7,106,476 B1 * | 9/2006 | Tonami et al. | 358/1.9 |

FOREIGN PATENT DOCUMENTS

| | | |
|---|---|---|
| EP | 1 107 578 A2 | 6/2001 |
| EP | 1 152 598 A2 | 11/2001 |

OTHER PUBLICATIONS

Rolleston, Robert, et al., *Accuracy of Various Types of Neugebauer Model;* IS&T and SID's Color Imaging Conference: Transforms & Transportability of Color (1993); pp. 32-37.

Boll, Harold, *a Color to Colorant Transformation for a Seven Ink Process,* IS&T's Third Technical Symposium on Proofing and Printing (1993); SPIE vol. 2170, pp. 108-118.

\* cited by examiner

ITERATIVE PRINTER CONTROL AND COLOR BALANCING SYSTEM AND METHOD USING A HIGH QUANTIZATION RESOLUTION HALFTONE ARRAY TO ACHIEVE IMPROVED IMAGE QUALITY WITH REDUCED PROCESSING OVERHEAD

BACKGROUND OF THE INVENTION

Existing control and calibration techniques for printing systems suffer from image quality (IQ) problems. Three well known IQ problems relating to control and calibration are: instability of the print engine, low quality of color balance, and contouring from the calibration and real-time recalibration. For example, printing systems with a high inter-separation interaction and a steep engine response tone reproduction curve (TRC) are prone to these image quality defects. Particularly, for the commonly used graphic arts quality byte-wide image path, 256 halftone levels are chosen from thousands available in a basic dot, so that the halftone levels are substantially equally spaced for human visual perception. The steep natural response of the printing systems and the variability in the position of the native tone curve requires that some of the 256 halftone levels must be allocated to regions into which the imaging process may drift. This can result in greater visual spacing between the halftone levels. Doing calibration using an 8 bit lookup table (LUT) means removing some halftone levels to locally steepen the natural engine response and replicating other halftone levels to locally soften the engine response. This process can lead to discontinuities (contours). Accordingly, it would be desirable to provide a method of printer control or calibration and color balancing that addresses the problems of print engine instability, low color balance quality and contouring.

SUMMARY OF THE INVENTION

A system and method and apparatus for printer control and color balancing are provided, wherein the method comprises defining combinations of colorants such as inks or toners that will be used to print images, defining a desired response for the combinations that are to be used, printing CMY halftone color patches, measuring the printed patches via an in situ sensor and performing color-balance calibration based on the measurements. The calibration is performed on the halftones while they are in a high quantization resolution form. The printing, measuring and calibration are done in real-time or during initial printer setup. The printing, measuring and calibration are preferably done iteratively, and corrections from each of the iterations are accumulatively integrated until the measurements are within a predetermined proximity of the desired response. The present method and apparatus employs a smaller number of patches than prior calibration methods, thereby reducing printing space and execution time since control patches are placed at the desired aim location in the color space.

DETAILED DESCRIPTION OF THE PREFERRED EMBODIMENT

It will become evident from the following discussion that embodiments of the present application set forth herein, are suited for use in a wide variety of printing and copying systems, and are not necessarily limited in application to the particular systems illustrated.

Figure 1:
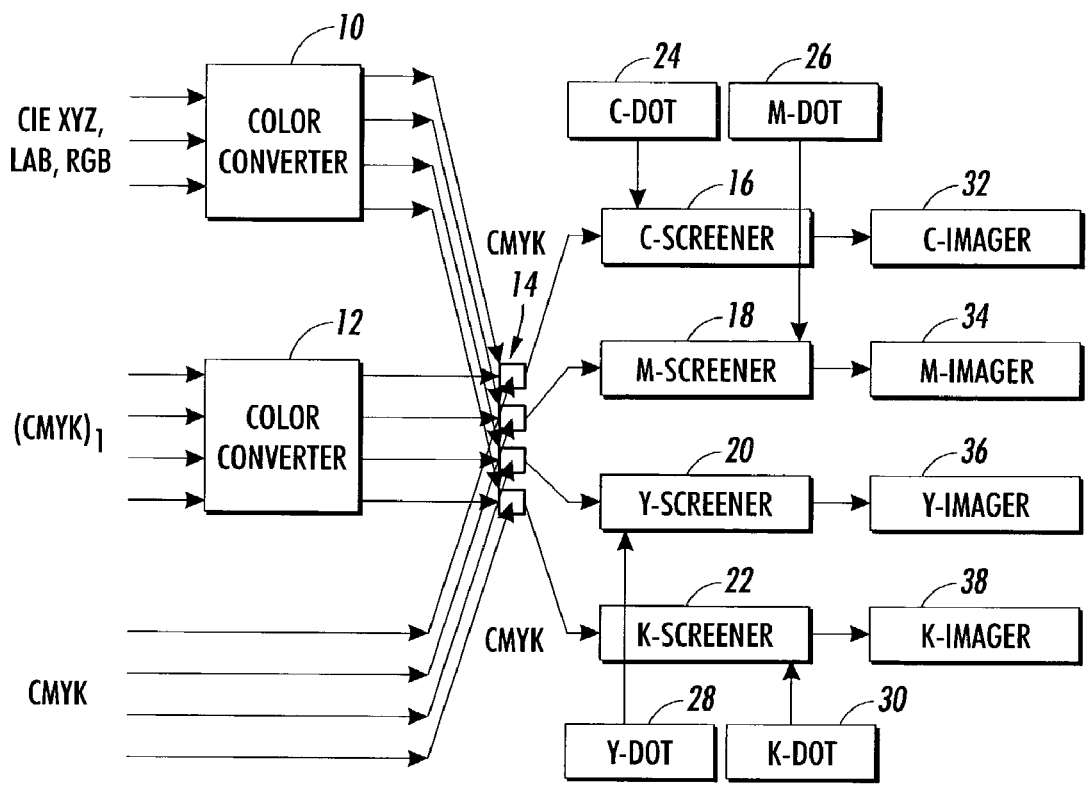
FIG. 1 is a schematic representation of exemplary image paths.

With attention to FIG. 1, depicted is an exemplary image path which may reside wholly or in part within one machine, such as a controller driving a printer or press, and another part may reside in the press or printer itself. Color converters 10 and 12 are used to convert from one color space to another. Such devices can, for instance, be implemented on a computer, using a programming language, and their operation is well known to one of ordinary skill in the art. One description of how this conversion can be accomplished is described in International Color Consortium (ICC) standard specifications. One-dimensional lookup tables 14 are used for calibrating the press or printer. The outputs from color converter 10 or 12 serve as the input to the one-dimensional lookup tables 14. The outputs of lookup tables 14 are connected to screeners 16-22. Each of these screeners receives an additional input from respective memory units 24-30. These memory units contain screening threshold values for the different color channels. The outputs from screeners 16-22 are provided to a corresponding imaging device 32-38. In the case of an ink jet printer, the imaging device may employ an ink nozzle, acoustic emitter or other device which emits small drops of ink. In the case of a xerographic printer the imaging device could be a laser or LED light source, which images onto a photoconductive drum or belt. It is to be understood the concepts of the present application may also be used in conjunction with other imaging devices, including those which emit material other than ink such as, for example, ionographic imagers where ions are directed to an electroreceptor or thermal devices that direct heat to thermally sensitive material.

To achieve high quality color printing image paths require calibration. Prior art calibration methods can generally be classified into two categories. A first set of calibration methods calibrate the individual channels of a printer separately, without including interactions between the channels. A second set of calibration methods incorporate such interaction between the channels. Usually these methods bring the printer into a state of known color balance, e.g., certain combinations of colorants in a first color space (e.g., CMY) produce a predefined value in a second color space (e.g., L*a*b*, or any other suitable color space, or density space). Both sets of calibration methods, however, obtain the printer calibration by applying one-dimensional corrections to the CMY channels as accomplished by the lookup tables 14.

In the first set of calibration methods, corrections are not correlated across color channels. For each channel a certain predefined response is defined, such as linear in L*, independent of the other channels. Of course, it is also possible to obtain a desired response in other measurable quantities, including density. The calibration process brings the response of each channel in agreement with the reference response. Since the definition of the reference response for each channel is independent of the other channels the calibration process is reasonably simple and straightforward.

For example, a wedge having desired percentages $p_i$ for each of the printer channels, is printed and measured by a sensor, such as a densitometer. From these measurements a one-dimensional correction is constructed for each printer channel that produces the desired response for each of the desired printer channel percentages ($p_i$) and each of the printer channels.

The one-dimensional correction is typically implemented by applying a correction to the respective data channel, usually via a tone reproduction curve (TRC) lookup table in the image path. A TRC lookup table often has 256 values which corresponds to an 8-bit image channel. Alternately, the correction may be applied by selection of halftone threshold values. In either correction method, for the printer channel percentages ($p_i$) that have not been printed, some form of interpolation is used to determine the corrected values for these unprinted percentages. The TRC method is widely practiced in the industry, and the halftone threshold method has been described by Borg in U.S. Pat. No. 5,625,716 and by Crean et al. in U.S. patent application Ser. No. 09/221,239 filed Dec. 28, 1998. This reference and other U.S. Patents and U.S. Patent Applications referred to in the following discussion are hereby incorporated by reference.

Calibration methods of this first set are easily extendible to other types of printers having more than four channels, for instance printers with CMYK-OG channels, also known as Hexachrome® printers, or for printers with CMYK-RGB channels (Kuppers ink set). Hexachrome® is a registered trademark of Pantone, Inc. of New Jersey.

Figure 2:
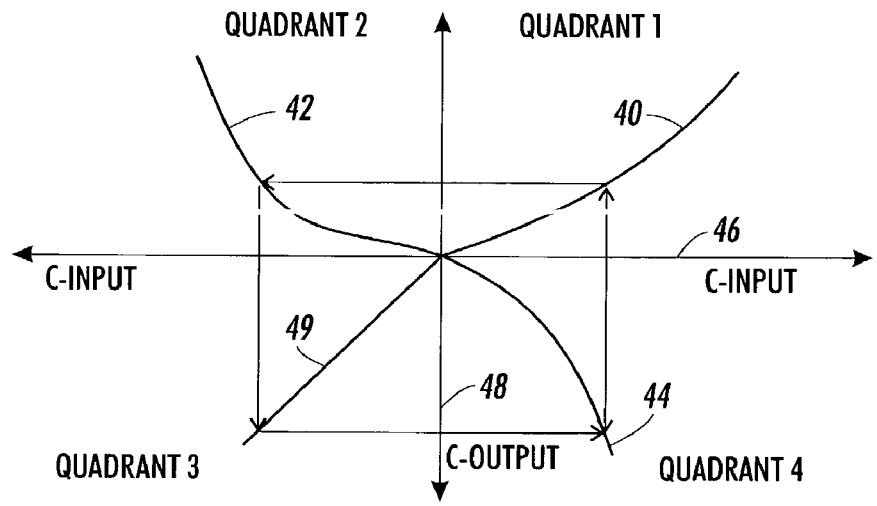
FIG. 2 illustrates a method of obtaining uncorrelated TRC corrections, by calculating calibration tables.

FIG. 2 illustrates one way in which these uncorrelated TRC corrections are obtained. Quadrant 1 shows a desired output 40 for one channel. This could, for instance, be linear in density, or linear in delta E with respect to white paper where delta E is a measure of color difference in L*a*b* color space. Quadrant 2 depicts a measured printer output response 42 of a device without any correction applied in the image path. In Quadrant 4, a one-dimensional TRC correction 44 is constructed by mapping an input value (C-input 46) to an output value (C-output 48) such that the desired output 40 is obtained. Line 49 in quadrant 3 represents a linear function that maps measured response values 42 to C-output values 48 that will produce the desired output for corresponding C-input values 46.

Figure 3:
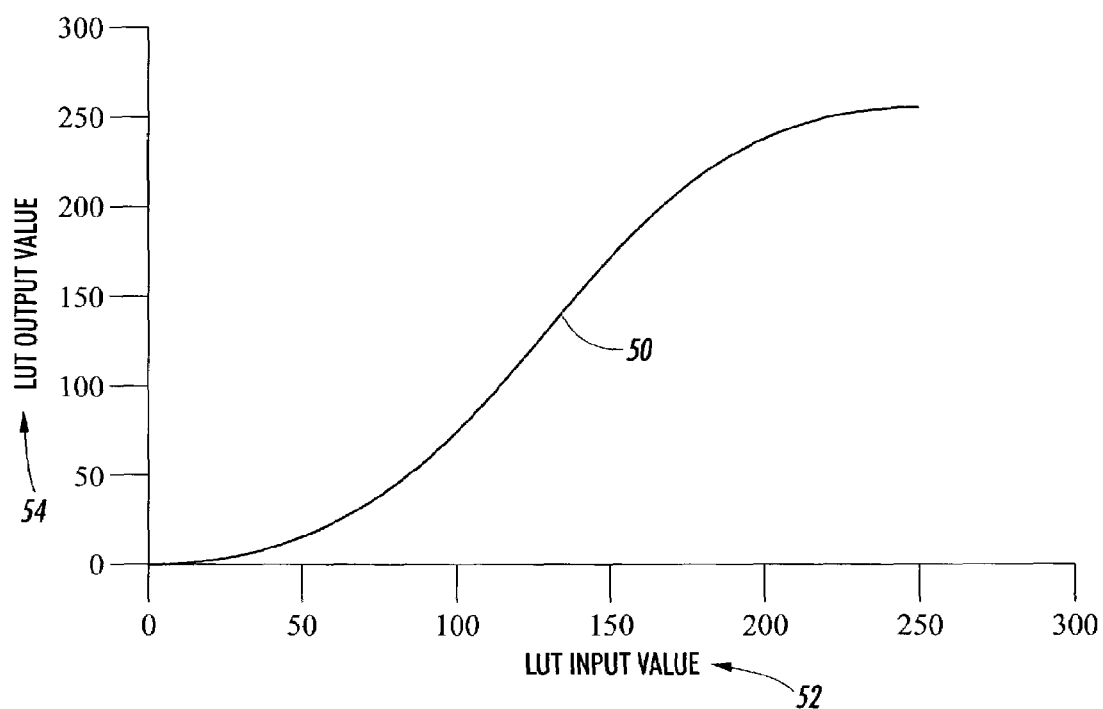
FIG. 3 is a visualization of a TRC lookup table.

FIG. 3 provides a visual representation of a TRC 50. An input C, M, Y or K value is found on the horizontal LUT input value axis 52. A vertical line from the determined position on the horizontal axis intersects the TRC curve 50 at a point that determines the LUT output value 54 in terms of C, M, Y or K respectively as read from the vertical axis.

The second set of calibration methods is similar to the first set in the sense that one-dimensional corrections are applied to the individual channels, however, in these methods the individual one-dimensional corrections are correlated to each other. The correlation is commonly of a kind that assures predefined CMY values produce predefined L*a*b* values, usually providing a corrected color. This is often referred to as a process for obtaining color balance calibration. The one-dimensional correction is typically implemented using a TRC lookup table in a manner similar to the first set of methods.

There are two groups of methods in the second set of methods in which a correlated one-dimensional correction can be obtained. In both groups, it is first necessary to specify the combinations of CMY that are needed to create the desired response. Table 1 for instance gives combinations of CMY for which a printer is to produce a color as defined by the L*a*b* values.

TABLE 1

A Gray Balance Example

| C | M | Y | L* | a* | b* | K |
|---|---|---|---|---|---|---|
| 0 | 0 | 0 | 100 | 0 | 0 | 0 |
| 10 | 9 | 9 | 92 | 0.3 | −0.3 | 10 |
| 20 | 18 | 18 | 84 | 0.6 | −0.6 | 20 |
| 30 | 27 | 27 | 76 | 0.9 | −0.9 | 30 |
| 40 | 36 | 36 | 68 | 1.2 | −1.2 | 40 |
| 50 | 45 | 45 | 60 | 1.5 | −1.5 | 50 |
| 60 | 54 | 54 | 52 | 1.8 | −1.8 | 60 |
| 70 | 63 | 63 | 44 | 2.1 | −2.1 | 70 |
| 80 | 72 | 72 | 36 | 2.4 | −2.4 | 80 |
| 90 | 81 | 81 | 28 | 2.7 | −2.7 | 90 |
| 100 | 90 | 90 | 20 | 3 | −3 | 100 |

The first group uses a small number of patches (approximately 200 or so) which are printed on the printer and then a printer model is applied to obtain a relation between CMY combination and produced L*a*b* values (See Balasubramanian, "Accuracy of Various Types of Neugebauer Model", IS&T and SID's Color Imaging Conference: Transforms and Transportability of Color, pp. 32-37, 1993). Alternatively, the first group uses a large number of patches (approximately 1000 or so) printed on the device and then measured. The relation between the CMY combinations and L*a*b* values is obtained through a form of interpolation. In both cases, printing is accomplished using the same image path shown in FIG. 1, but without any corrections in the image path, so the TRC curves are not changing the input data.

In both cases the correlated one-dimensional TRCs are obtained in the following manner. The relation between the CMY values and the produced L*a*b* of the printer is inverted. This can be done in many ways; see for instance Plettinck et al., U.S. Pat. No. 05,689,349, "Method and device for generating printing data in a color space defined for non-standard printing inks". The inverted relation allows mapping any given L*a*b* value onto a respective CMY combination that will produce the given L*a*b* value. Applying this method for the L*a*b* values of FIG. 2, the CMY values that produce these desired L*a*b* values are obtained. Mapping the CMY values listed in Table 1, onto these CMY values yields the one-dimensional correlated corrections.

The second group of calibration methods use process control techniques, and prints the CMY patches as listed in Table 1. The L*a*b* values for these patches are measured and a feedback loop is constructed. The differences in produced and desired L*a*b* values are used as control signals, and from these signals, corrections to the CMY values are obtained that will produce L*a*b* values closer to the desired values. The process is repeated until the produced L*a*b* values are within a predetermined proximity of the desired values. The TRCs are constructed using the same techniques as used for the first group of methods. A more detailed explanation of the second group of methods is given in Mestha et al., U.S. patent application Ser. No. 09/566,291 filed May 5, 2000 and incorporated herein by reference. Irrespective of how the correlated TRCs are determined, this second set of methods exhibits the same disadvantages as the first set. Particularly in both sets, it is the manner by which the corrections are applied to the image path that compromises the image quality.

Since the image paths in both sets of methods are the same, using either uncorrelated or correlated TRC corrections, both sets share the same disadvantages. In 8-bit image path channels, where the individual channels are all 8-bit values, the potential image quality problems occur. Applying corrections to 8-bit values, and keeping the results of this correction as an 8-bit value, can produce banding and/or contouring, i.e., visual steps reducing the image quality. This can be seen in smooth vignettes and contone images with smooth gradations.

Several methods have been used to overcome such banding problems, specifically in vignettes. Noise is often added to vignettes, masking the potential banding problems. To be effective, the noise is generally made several levels in amplitude and is generated with a frequency that does not beat with the halftone, a challenge that potentially produces some perceptual image quality degradation. Although noise can be applied in vignettes without a great visual loss in image quality, the same cannot be said for adding noise to images. When this is done, the quality of the images is often degraded and, therefore, adding noise to images is not an acceptable solution to the problem.

In consideration of the foregoing, concepts of the present application are directed to calibration and control methods for achieving high quality, stable, color-balanced printing. An aspect of the calibration and control methods is performing color-balance calibration and control on the halftones while they are in a high quantization resolution form. In one embodiment an iterative color balancing process is used with an in situ sensor to perform real-time measurements on the substrate. The iterative color balancing method has the advantage of being independent of the marking technique, and can be applied in real-time. Using the high quantization halftone enables contour-free calibration.

As will be described in greater detail below, concepts of the present application describe a combination of controls, color balancing and dynamic programming of coarse resolution halftones. Halftones can be designed to possess many possible fill patterns. Halftones with multiple dots, for example, can possess a fill sequence with thousands of levels. Despite this potential for achieving small steps in area coverage (density), halftones are often stored and used at 8 bits per pixel resulting in 256 levels for uniform input areas. It is preferable in embodiments of the present invention to store the halftone fill sequence at its original resolution or in some higher quantization state, 10 bits per pixel for example. Applying TRC compensation to the halftone in this higher quantization state can avoid contouring errors that can occur when applying corrections at lower quantization states.

As noted above, calibration and control of the halftone array is a feature of the present application. Halftone arrays usually exist in three forms: a fine quantization form, typically referred to as a fill-order array, wherein the sequence for turning on each sub-pixel in a unit cell is specified, a coarse quantization form often referred to as a threshold array wherein a pixel value above which a sub-pixel is turned on is stored at its location in the fill-order array, and a direct mapped, or lookup table based, process wherein an output sub-pixel string is stored for each input pixel value and each output pixel in a unit cell. It is also possible to implement something between the first two cases. For example, a halftone with 65,536 pixels requires 16 bits to store the complete fill order. Instead of quantizing all the way down to 8 bit thresholds, fill sequence values can be grouped to give a quantization at 10 bits/pixel for example. The 10 bit case is less likely to produce contouring than the 8 bit case.

In prior methods, monochrome calibration has been performed on the fine resolution form (Crean et al., U.S. patent application Ser. No. 09/221,239) and used to direct the clustering of levels into the coarse quantization form. Gray balance calibration (or in general, color balance) is currently obtained by applying one-dimensional correlated 8 bit color lookup tables in the image path. This limits the image quality of existing systems due to calibration or control of the halftone in a low quantization state, or due to subsequent application of an 8-bit lookup table in the image path.

In the methods of the present application, dots are designed in the fine quantization, fill order view, yielding in many cases 500 to 65,536 halftone levels. Of these, 256 are selected for the threshold array representation, selecting levels to give equal changes in visual perception, thus packing the levels in the regions where the system response changes most rapidly. However, since the range of steepest change can vary with system tuning, substrate type and history, levels must be allocated across all regions where the systems response could change. For any particular state of the system, some levels are kept, and those in regions which, at any given time, do not have a strong response are deleted. Thus the spacing of levels is always wider than would be possible where the allocation of levels have been optimized for the current response.

With attention to one aspect of the present methods, image quality is improved by building all system considerations into the threshold array using a high resolution form of the halftone. That is, the present methods avoid contours and poor color balance associated with the existing systems. In embodiments of the present invention, the processes for the calibrations and controls use elements that are optimized for the overall system needs. For example, color balance is performed using the high resolution form of the halftone array, and system controls and calibrations are performed using the high resolution form of the array.

An example of using the higher resolution form of the halftone for calibrations is shown in Table 2. It shows more accurate and smoother steps in the tone gradations for the higher resolution halftone.

TABLE 2

| | | | Example of Discretization Errors | | |
|---|---|---|---|---|---|
| | | Real | 8-bit output | 9-bit output | 10-bit output |
| 8-bit input Digital | Real | difference between two consecutive output values | Difference between two consecutive output values | Difference between two consecutive output values | Difference between two consecutive output values |

| input value | output value | expressed in % | Output value | expressed in % | Output value | expressed in % | Output value | expressed in % |
|---|---|---|---|---|---|---|---|---|
| 126 | 123.45 | 1.06 | 123 | 0.78 | 247 | 0.98 | 495 | 1.08 |
| 127 | 126.15 | 1.06 | 126 | 1.18 | 253 | 1.17 | 506 | 1.08 |
| 128 | 128.85 | 1.06 | 129 | 1.18 | 258 | 0.98 | 517 | 1.08 |
| 129 | 131.55 | 1.06 | 132 | 1.18 | 264 | 1.17 | 528 | 1.08 |
| 130 | 134.25 | 1.06 | 134 | 0.78 | 269 | 0.98 | 539 | 1.08 |
| 131 | 136.95 | 1.06 | 137 | 1.18 | 274 | 0.98 | 549 | 0.98 |
| 132 | 139.63 | 1.05 | 140 | 1.18 | 280 | 1.17 | 560 | 1.08 |
| 133 | 142.31 | 1.05 | 142 | 0.78 | 285 | 0.98 | 571 | 1.08 |
| 134 | 144.97 | 1.04 | 145 | 1.18 | 291 | 1.17 | 582 | 1.08 |
| 135 | 147.61 | 1.04 | 148 | 1.18 | 296 | 0.98 | 592 | 0.98 |
| 136 | 150.24 | 1.03 | 150 | 0.78 | 301 | 0.98 | 603 | 1.08 |
| 137 | 152.85 | 1.02 | 153 | 1.18 | 306 | 0.98 | 613 | 0.98 |
| 138 | 155.44 | 1.01 | 155 | 0.78 | 311 | 0.98 | 624 | 1.08 |
| 139 | 158.00 | 1.01 | 158 | 1.18 | 317 | 1.17 | 634 | 0.98 |
| 140 | 160.54 | 1.00 | 161 | 1.18 | 322 | 0.98 | 644 | 0.98 |
| 141 | 163.06 | 0.99 | 163 | 0.78 | 327 | 0.98 | 654 | 0.98 |
| 142 | 165.54 | 0.97 | 166 | 1.18 | 332 | 0.98 | 664 | 0.98 |
| 143 | 167.99 | 0.96 | 168 | 0.78 | 337 | 0.98 | 674 | 0.98 |
| 144 | 170.41 | 0.95 | 170 | 0.78 | 341 | 0.78 | 684 | 0.98 |
| 145 | 172.80 | 0.94 | 173 | 1.18 | 346 | 0.98 | 693 | 0.88 |
| | | Continuous variation of the derivative | 13 discontinuous transitions of 0.4% | | 12 discontinuous transitions of 0.2% | | 7 discontinuous transitions of 0.1% | |

Figure 4:
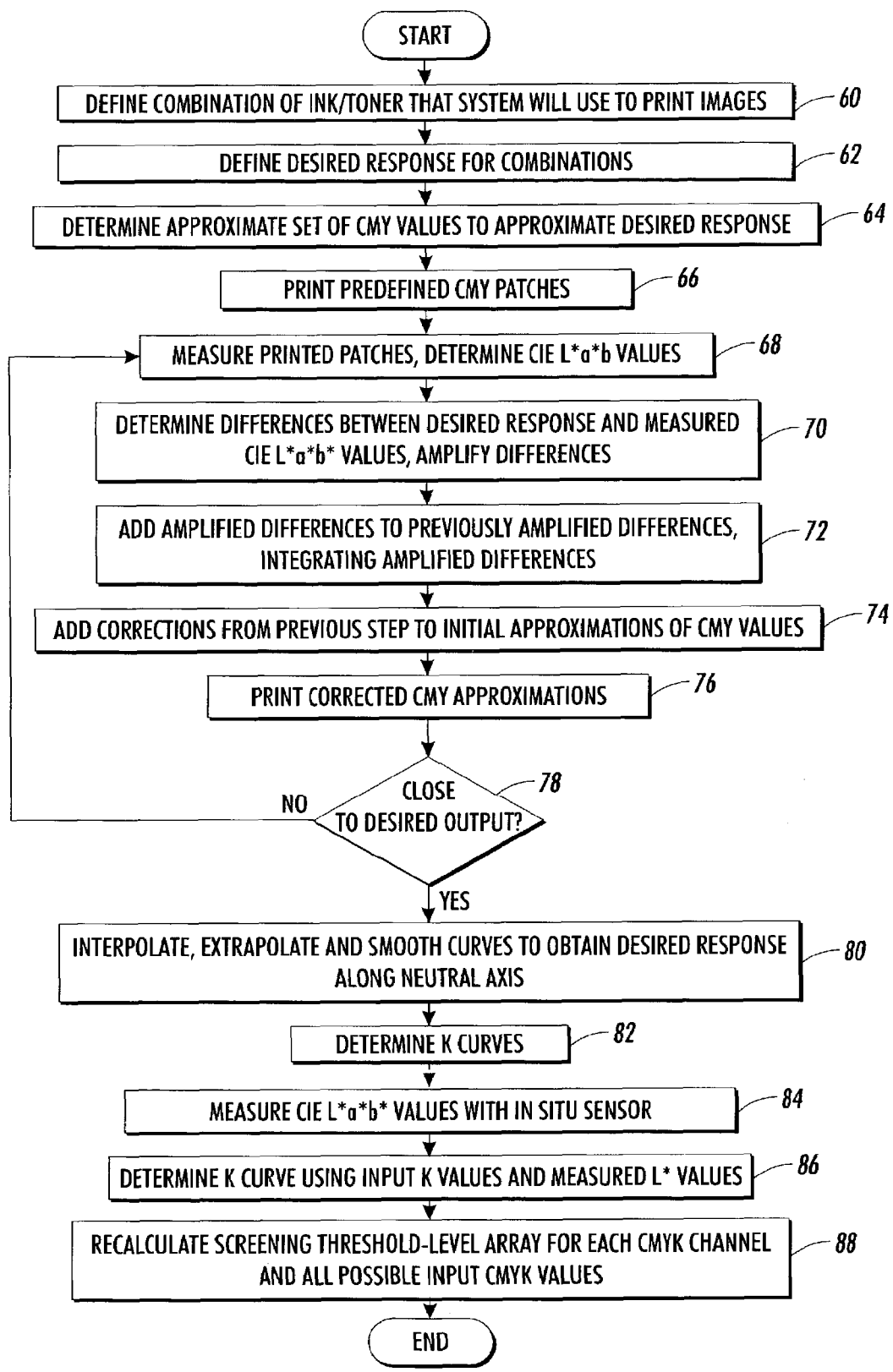
FIG. 4 is a flow diagram of a preferred method of the present invention.

One embodiment of the present invention, in a multi ink image reproduction system, for example, is diagrammed in FIG. 4. The first step 60 of the method consists of defining combinations of ink the system will use to print the images. This can be done in different ways, as has, for example, been described in "A Color to Colorant Transformation for a Seven Ink Process", Harold Boll, IS&T's third technical Symposium on Proofing and Printing, 1993. This step has been described in prior literature and will, therefore, not be described in detail here. For a CMYK printing press, for example, these combinations are CMY and K. For the sake of clarity of the explanation, the discussion here is limited to the explanation of the preferred embodiment for the CMYK case. It shall, however, be clear to one of ordinary skill in the art how to extend the method to any type of press or printer having more than 4 inks.

A second step 62 of the method consists of defining a certain desired response for the above-described combinations. In one embodiment, the response of the press is assumed to be close to the response of a typical offset press, as can be found in the definition of the Specification for Web Offset Printing (SWOP) conditions, provided by the Graphics Arts Technical Foundation (GATF). Such a response provides for a color for some combinations of CMY. An example of such a color balance can be found in Table 1. It also specifies the desired response for the K-channel.

A third step 64 determines an approximate set of CMY values that approximate the desired response. Before doing this, it is generally useful to characterize the toe (highlight) and shoulder (saturated) regions of the engine response, where varying C, M and Y produces no significant change in L*a*b*, to make sure that none of the chosen CMY values fall in these regions.

A fourth step 66 of the method is to print a number of predefined CMY patches, these patches being defined by the previous step (64), i.e., they belong to the set of the patches as defined in step 3.

A fifth step 68 includes measuring the printed patches and determining selected color space values, such as CIE L*a*b* values.

A sixth step 70 is to determine the difference between the desired response and the responses determined in the fifth step (68) and amplify these differences. A gain matrix converts the L*a*b* differences into CMY differences. The gain matrix corresponding to each predetermined CMY patch is predetermined from a first set of input-output characterizations of the printer and is stored in a memory (not shown). This assumes that the CMY to L*a*b* conversion is linear, which is not completely the case, but it is close enough to reality for the method to work. It is also assumed that the dots have been designed so the relationship between L*a*b* and whatever quantity is being used to characterize the C, M, or Y level (fractional area coverage, for example) is smooth and well behaved.

A seventh step 72 adds the amplified differences in the 6th step (70), and add them to previously determined amplified differences determined in previous iterations of the 6th step (70). This means that steps 5 and further will be repeated several times and the amplified differences integrated in the 6th step (70) over the different iterations.

An eighth step 74 takes the corrections from the 7th step (72) and adds the corrections to the initial approximations of the CMY values determined in the 3rd step (64).

A ninth step 76 is to print the CMY values determined in the 8th step (74).

Steps 5, 6, 7, 8 and 9 (68-76) are repeated, until the output is close to a desired output as determined at the tenth step 78. When this is achieved, the system has converged to a state in which the mapping of the input CMY is obtained in order to produce the desired CIE L*a*b* values. This defines the mapping for all CMY values of Table 1 in order to obtain the desired output. One can view these mappings as one-dimensional transformation curves for each of the CMY input channels.

The eleventh step 80 of the method consists of interpolating, extrapolating, and smoothing these curves to obtain the desired response alone the neutral axis. In the highlight region, the curves are normally extended to intersect the L* axis at the requested amount of C, M, and Y, where some C, M, and Y are actually deposited. For xerographic engines, these values are normally offset a considerable amount from zero—i.e., very small dots generally do not print at all. In the shoulder region, the curves must be warped so they smoothly approach 100% as the requested L* approaches its minimum value. This maybe done using the approach discussed in U.S. patent application Ser. No. 09/817,186 filed Mar. 27, 2001 (Smooth Monotonic tone Reproduction Curve End Point Adjustment).

A twelfth step 82 of the method consists of determining the K curves. The K curves are obtained by first printing patches with C=M=Y=0 and varying K incrementally from 0 to 100%.

In the thirteenth step 84, the CIE L*a*b* values of the patches are measured using the in situ densitometer.

The fourteenth step 86 is computational. It comprises determining K-curves using input K values and the measured L* values (a* and b* values are discarded from this measurement). The desired K-curve is determined by using standard interpolation and smoothing techniques discussed previously.

The fifteenth step 88 of the method consists of recalculating the screening threshold-level array for each of the CMYK channels, for all possible CMYK input values. The one-dimensional correlated transform curves are used as interpolation functions to select threshold values from the fill order array.

Incorporating the color balancing and/or linearization process into a halftone array that contains more than 256 threshold levels allows greater precision, and hence incur smaller quantization errors. Many commonly used halftone screens contain 1000 to 10,000 levels, which will significantly reduce the quantization error in comparison to the 256 levels afforded by 8 bit TRC mappings. Furthermore, this is an approach that can be used successfully with vignettes and scanned images alike.

This approach has an additional benefit in that the value of CMY and K for a pixel sent from the digital front-end (DFE) to the printer is dependent only on the document content and the relatively static color mixing properties of the system. In other words the pixels sent from the DFE are not dependent on the specific response of the print engine at a certain point in time. For optimum image quality in an 8 bit system, the CMYK values represent values related to visual quantity such as L*. Most of the system variability is optimally handled by building it into the threshold array. In special cases, contone bytes are not directly related to visual perception, but have special meaning in cases such as pixels on an antialiased edge, cases which can be marked by a tag value or inferred by context. The averaging (or similar linear operation) on a set of pixels does not yield the L* over the large pixel, but the encoded value is used by the rendering logic to recover the correct position of the edge. The rendering logic expects the pixel stream from the raster image processor (RIP) to be independent of the current state of the engine so that preprogrammed logic can be applied to the pixel stream to develop the special case rendering. Handling most of the system variability in threshold array preserves the integrity of the input pixel stream.

Figure 5:
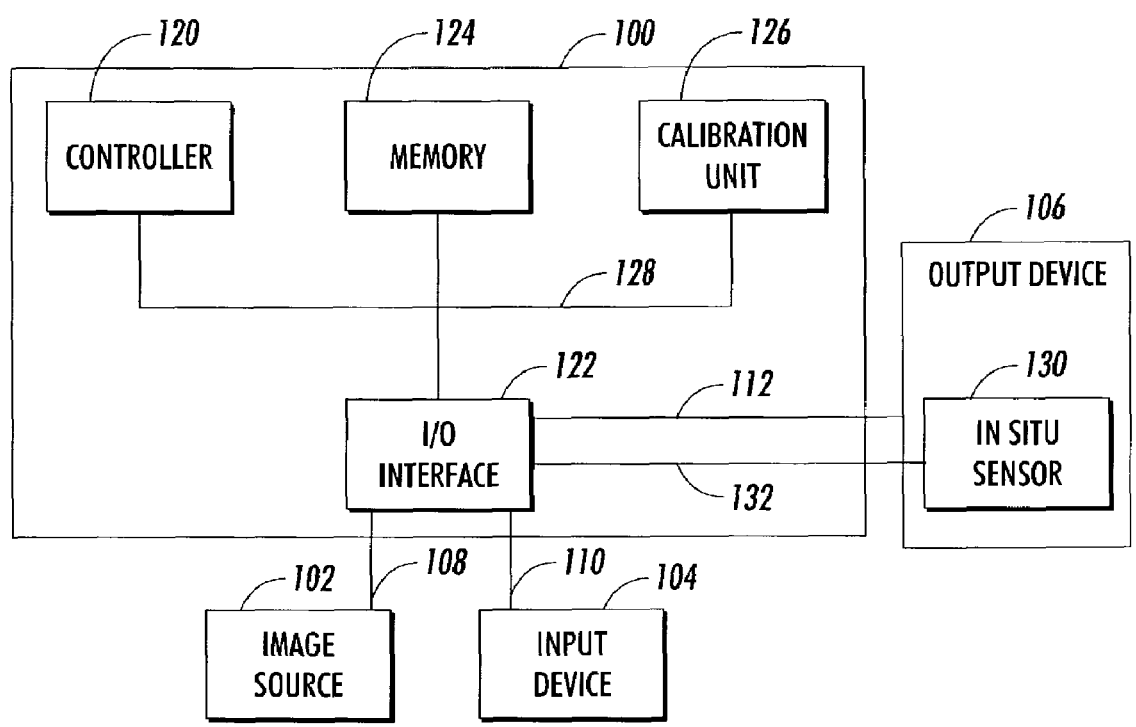
FIG. 5 is an exemplary embodiment of an image processing apparatus incorporating printer control and color balance calibration in accordance with embodiments of the present invention.

FIG. 5 shows an exemplary embodiment of an image processing apparatus 100 incorporating printer control and color balance calibration in accordance with the present application. An image data source 102, an input device 104 and an image output device 106 are connected to the image processing apparatus 100 over links 108, 110 and 112, respectively. The image data source 102 can be a digital camera, a scanner, a locally or remotely located computer, an electrophotographic printing system in a xerographic environment, or any other known or later developed device that is capable of generating or otherwise providing electronic image data. Similarly, the image data source 102 can be any suitable device that stores and/or transmits electronic image data, such as a client or a server of a network.

The image data source 102 can be integrated with the image processing apparatus 100, or the image data source 102 can be connected to the image processing apparatus 100 over a connection device, such as a modem, a local area network, a wide area network, an intranet, the Internet, any other distributed processing network, or any other known or later developed connection device.

Similarly, the image output device 106 can be integrated with the image processing apparatus 100, or the image output device can be connected to the image processing apparatus 100 over a connection device, such as a modem, a local area network, a wide area network, an intranet, the Internet, any other distributed processing network, or any other known or later developed connection device. The image output device 106 may also be any other known or later developed device which is capable of receiving electronic image data over the link 112 from the image processing apparatus 100. The link 112 can thus be any known or later developed system or device for transmitting the electronic image data from the image processing apparatus 100 to the image output terminal.

The image processing apparatus 100 shown in FIG. 5 is connected to the image output device 106 over link 112. Alternatively, the image output terminal 106 may be an integral part of the image processing apparatus 100. An example of this alternative configuration would be a digital copier or the like. It should be appreciated that the image processing apparatus 100 can be any known or later developed type of image processing apparatus. There is no restriction on the form the image processing apparatus 100 can take.

The input device 104 can be any known or later developed device for providing control information from a user to the image processing apparatus 100. Thus, the input device 104 can be a control panel of the image processing apparatus 100, or could be a control program executing on a locally or remotely located general purpose computer, or the like. As with the above-described link 108 and link 112, the link 110 can be any known or later developed device for transmitting control signals and input data from the input device 104 to the image processing apparatus 100.

The image processing apparatus 100 includes a controller 120, an input/output interface 122, a memory 124, and a calibration circuit 126. The controller 120, memory 124 and calibration circuit 126 are connected to the input/output interface 122, and to each other via a bus 128. The electronic image data from the image data source 102, and any control and/or data signals from the input device 104, are input through the I/O interface 122, and, under control of the controller 120, are stored in the memory 124 and/or provided to the controller 120.

The memory 124 preferably has at least an alterable portion and may include a fixed portion. The alterable portion of the memory 124 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed memory device.

An in situ sensor 130 is in communication with the I/O interface 122 via link 132. The in situ sensor 130 is provided for measuring color patches printed according to concepts of the present application. The in situ sensor and corresponding link 132 are capable of measuring and sending data in a high quantization format. Link 132 is capable of sending data comprising more than 8 bits, either by having a data path wider than 8 bits or by sending data serially or in packets of bytes. The image data path 112 can also be 8 bit wide or wider. It should also be clear that the in-situ sensor can be replaced by an offline sensor.

The links 108, 110, 112 and 132 can be any known or later developed device or system for connection, including a direct cable connection, a connection over a wide area network or a local area network, a connection over an intranet, a connection over the Internet, or a connection over any other distributed processing network or system. In general, the links 108, 110, 112 and 132 can be any known or later developed connection system or structure usable for connection as described above which may be achieved as wireline connections and wireless connections.

While FIG. 5 shows the calibration unit 126 and the image processing apparatus 100 as portions of an integrated system, the calibration unit 126 may be provided as a separate device from the image processing apparatus 100. That is, the calibration unit 126 maybe a separate device attachable upstream of a stand-alone image processing apparatus 100. For example, the calibration unit 126 maybe a separate device which interfaces with both the image data source 102 and the image processing apparatus 100.

Furthermore, the calibration unit 126 may be implemented as software on the image processing apparatus 100 or the image data source 102. Other configurations of the elements shown in FIG. 5 may be used without departing from the spirit and scope of this invention.

While the invention has been described with respect to specific embodiments by way of illustration, many modifications and changes will occur to those skilled in the art. It is therefore, to be understood that the appended claims are intended to cover all such modifications and changes which fall within the true spirit and scope of the invention.

What is claimed is:

1. A method for printer control and color balancing, the method comprising:
    defining combinations of colorants wherein the combinations of colorants will be used to print images;
    defining a desired response for the defined combinations;
    determining an approximate set of CMY values to approximate the desired response;
    printing predefined CMY patches using the approximate set of CMY values;
    performing an iterative correction integration procedure comprising:
        measuring the printed patches;
        determining three measurement CIE L*a*b* values of the measured printed patches;
        determining differences between the desired response and the measured CIE L*a*b* values;
        amplifying each difference by a respective predetermined gain;
        integrating the amplified differences by adding the amplified differences to a sum of previously amplified differences;
        adding the sum of amplified differences to the approximate set of CMY values forming a set of corrected CMY values;
        printing predefined CMY patches using the corrected set of CMY values; and
        repeating the correction integration procedure until the determined differences are within a predetermined range of the desired response, and wherein the corrected set of CMY values forms mappings of the respective CMY values, defining a one-dimensional transformation curve for each of the CMY channels;
    interpolating, extrapolating and smoothing the transformation curves to obtain a desired response along a neutral axis;
    determining K curves corresponding to a fixed set of CMY values;
    printing patches corresponding to incremental values of K for the fixed set of CMY values;
    measuring CIE L*a*b* values of the patches corresponding to incremental values of K;
    calculating adjusted K curves using input K values and the measured L* values; and
    calculating a screening threshold-level array for each CMYK channel and all possible input CMYK values.

2. The method according to claim 1, wherein the colorants are selected from at least one of inks and toners.

3. The method according to claim 1, wherein the desired response is selected to be substantially similar to the response of a typical offset press as specified in the definition of the Specification for Web Offset Printing conditions.

4. The method according to claim 1, the determining of an approximate set of CMY values step further including deleting CMY values from the selected set of CMY values for which no significant change in L*a*b* is produced when compared to the produced L*a*b* of the remaining selected CMY values.

5. The method according to claim 1, wherein the curves are extended in a highlight region to intersect L*=100.

6. The method according to claim 1, wherein the fixed set of CMY values correspond to C=M=Y=0.

7. The method according to claim 1, wherein the incremental values of K correspond to increments varying from 0 to 100 percent.

8. The method according to claim 1, wherein the measuring CIE L*a*b* values is performed with an in situ measurement device.

9. The method according to claim 1, wherein the correction integration procedure is iterated a number of times not exceeding a predetermined maximum number of iterations.

* * * * *